United States Patent [19]

Mosse et al.

[11] 4,010,241
[45] Mar. 1, 1977

[54] PROCESS FOR THE PRODUCTION OF HYDROGEN FLUORIDE, PHOSPHORIC ANHYDRIDE, CALCIUM POLYPHOSPHATES AND NITRIC ACID

[76] Inventors: Alfred Lvovich Mosse, Leninsky prospekt, 72a, kv. 66; Vladimir Vasilievich Pechkovsky, ulitsa Derevoobdelochnaya, 27, kv. 55; Anatoly Ivanovich Teterevkov, ulitsa Kalinovskogo, 5, kv. 4; Igor Sergeevich Burov, ulitsa Yakuba Kolosa, 39, kv. 48, all of Minsk; Jury Nikolaevich Vilk, prospekt Energetikov, 60, kv. 65; Vadim Andreevich Ershov, prospekt Veteranov, 105, kv. 29, both of Leningrad; Alexandr Antonovich Chelnokov, ulitsa Knorina, 11/2 kv. 114, Minsk; Oleg Iosifovich Yasko, ulitsa Kalinovskogo, 73, korpus 2, kv. 5, Minsk; Vladimir Vladimirovich Bysjuk, ulitsa Ostrovskogo, 27, kv. 56, Minsk; Elena Dmitrievna Dzjuba, ulitsa Very Khorunzhei, 18, kv. 19, Minsk, all of U.S.S.R.

[22] Filed: Aug. 27, 1974

[21] Appl. No.: 501,081

[52] U.S. Cl. .............................. 423/304; 423/315; 423/484; 423/390; 423/322
[51] Int. Cl.$^2$ ................. C01B 25/12; C01B 15/16; C01B 21/38; C01B 7/22
[58] Field of Search .......... 423/299, 305, 317, 322, 423/393, 483, 484, 304, 390, 315

[56] References Cited

UNITED STATES PATENTS

| | | | |
|---|---|---|---|
| 3,241,917 | 3/1966 | Lapple | 423/318 |
| 3,380,904 | 4/1968 | Goldberger | 423/322 X |
| 3,572,991 | 3/1971 | Markey | 423/393 |
| 3,832,448 | 8/1974 | Longfield | 423/322 |

FOREIGN PATENTS OR APPLICATIONS

| | | | |
|---|---|---|---|
| 7,004,839 | 11/1971 | France | 423/322 |

*Primary Examiner*—Oscar R. Vertiz
*Assistant Examiner*—Gregory A. Heller
*Attorney, Agent, or Firm*—Holman & Stern

[57] ABSTRACT

A process for the production of hydrogen fluoride, phosphoric anhydride, calcium polyphosphates and nitric acid, is disclosed, characterized in that natural phosphate is heated by a plasma stream of working gas in the presence of water vapors to form hydrogen fluoride which is recovered as a commercial product. Then the thus defluorinated phosphate is further heated by an air plasma stream having a bulk temperature of at least 3,500° K. and containing nitrogen oxides. Under such conditions, the defluorinated phosphate decomposes to form phosphoric anhydride and calcium oxide.

The gas stream carrying the phosphoric anhydride, the calcium oxide and the nitrogen oxides is cooled down to yield, as commercial products, either phosphoric anhydride and nitric acid, or calcium polyphosphates containing up to 70% $P_2O_5$ and nitric acid, or else all of the three products, depending on the cooling conditions.

The advantages of the proposed process are as follows:

high rate of the process, high concentration of hydrogen fluoride in the gas, and the possibility of simultaneously producing a range of products from cheap raw material while avoiding the use of other commercial products as feedstock for the process.

3 Claims, 1 Drawing Figure

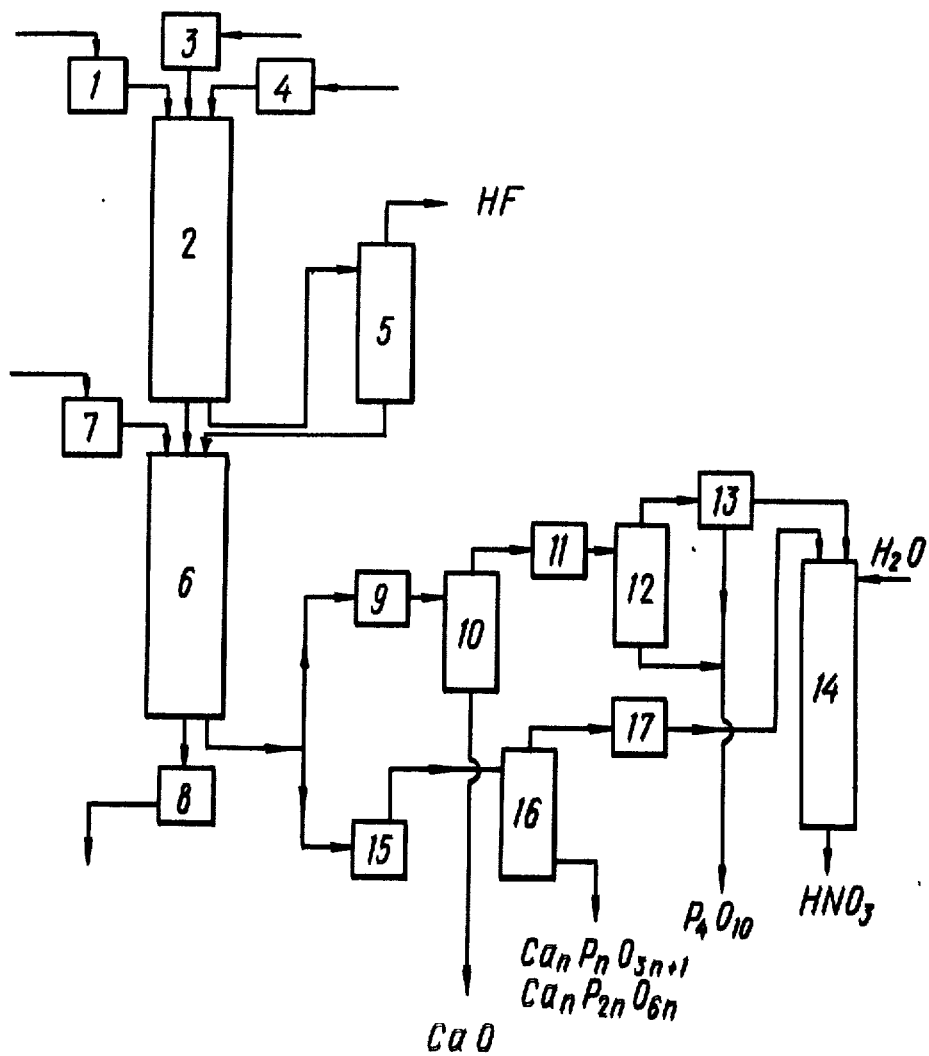

PROCESS FOR THE PRODUCTION OF HYDROGEN FLUORIDE, PHOSPHORIC ANHYDRIDE, CALCIUM POLYPHOSPHATES AND NITRIC ACID

BACKGROUND OF THE INVENTION

The present invention relates to the processing of natural phosphates, and, more particularly, to a process for the production of hydrogen fluoride, phosphoric anhydride, calcium polyphosphates and nitric acid from natural phosphates.

Each of said products is widely used in the national economy.

Currently, the waste gases which are formed while processing natural phosphates to produce phosphoric fertilizer, phosphoric acids and defluorinated phosphates constitute a major source of commercial hydrogen fluoride (see: M. E. Pozin, Tekhnologiya mineral'-nykh solei (Processing of Mineral Salts), Goskhimizdat, Leningrad, 1961, p. 725; V. V. Illarionov et al., Gidrotermicheskaya pererabotka fosfatov na udobreniya i kormovye sredstva (Hydrothermal Processing of Phosphates to Fertilizer and Fodder), "Khimiya", Moscow, 1965).

It is known in the art to employ two processes for the production of defluorinated phosphates, viz. fusing or sintering natural phosphates with a variety of additives, the rate of the defluorination process being markedly increased in the presence of water vapors.

Defluorination of natural phosphates and their mixtures with various additives is effected in rotary tube furnaces, electric furnaces and cyclones at temperatures of from 1,500° to 1,800° K. and reaction times of from fractions of an hour to 6 to 7 hours.

In view of the low intensity of the prior art processes for the defluorination of natural phosphates, defluorination is effected in large-capacity apparatus, resulting in the dilution of gaseous products, including fluorine, with huge quantities of the heat carrier gas. Thus, for instance, in hydrothermal defluorination of natural phosphates, the outgoing gas comprises a mixture of HF and $SiF_4$. The concentration of this mixture in the outgoing gases, converted to pure fluorine, amounts to 0.5 to 8.0 g/cu.nm, depending on the kind of technology used in the process. The degree of defluorination is 96 to 98 percent.

The prior art processes for the defluorination of natural phosphates have the following disadvantages:
low rate of defluorination;
low concentration of fluorine in the outgoing gases;
the need for special preparation of the feedstock (granulation, introduction of additives).

Phosphoric anhydride is currently produced by combusting in an air stream elemental phosphorus produced at the first step of carbon reduction of natural phosphates mixed with silica or other fluxes at a temperature of from 1,400° to 1,700° K. in a phosphorus electric furnace of a shaft type. The resultant gases containing gaseous phosphorus are purified on electric filters and condensed to form liquid phosphorus which is delivered to the combustion chamber where phosphorus is oxidized to form gaseous phosphorus anhydride. The latter is sent to spray towers for absorption to give phosphoric acid, or to special condensing towers where $P_2O_5$ is condensed as a solid product.

Said process can only use highly concentrated natural phosphates as feedstock, for any reduction of the $P_2O_5$ level in the feedstock is associated with a large increase in the power consumption and coke consumption rates, coke being the reducing agent. Additionally, the process requires the step of charge preparation, i.e. admixing the feedstock natural phosphate with silica and converting the mixture into a lumpy material by agglomeration, briquetting, etc. Agglomeration is needed to provide for a better contact of the reducing agent with the charge; hence, the phosphate fines are not utilized in the process and are returned to the first step of charge preparation.

The prior art process for the production of phosphoric anhydride has a number of disadvantages:
the process involves more than one step;
the feedstock must undergo special preparation;
the feedstock must be in a concentrated form;
a premium reducing agent (coke) is used; and
the process is highly capital intensive.

At present calcium polyphosphates are primarily produced by reacting natural phosphate with sulfuric acid or phosphoric acid to form monosubstituted orthophosphate.

The product monosubstituted orthophosphate is dehydrated by heating to 600° K. to form polyphosphates, and then the resultant sintered mass is comminuted.

It is likewise known to produce calcium metaphosphate by reacting phosphoric anhydride with tri- or dicalcium orthophosphate at a temperature of 1,300° to 1,500° K.

According to the latter technique, lumpy or agglomerated natural phosphate is charged into a shaft furnace. Liquid phosphorus is sprayed and combusted in the combustion chamber disposed at the base of the shaft furnace. The phosphoric anhydride which is formed in the combustion of the liquid phosphorus together with the hot gases passes through a layer of natural phosphate and reacts therewith to form calcium metaphosphate which, being molten, flows downward and is periodically removed from the furnace. The melt is rapidly cooled, and the resultant product is comminuted and screened. Just as in the phosphorus production process, the feedstock has to be specially prepared by agglomeration in order to produde calcium metaphosphate.

The disadvantages of the foregoing processes for the production of polyphosphates are as follows:
the processes have a low rate and involve more than one step;
the feedstock requires preparation; and
commercial products, such as phosphorus, acids, etc., have to be employed as feedstock.

At the present time, nitric acid is manufactured predominantly by the ammonia technique which comprises contact oxidation of ammonia. The process includes two steps: catalytic oxidatin of ammonia to nitrogen oxide on platinum catalysts, and oxidation of the nitrogen oxide to higher nitrogen oxides subsequently absorbed by water.

As can be seen, each of the products is manufactured according to a special flow chart with the use of different commercial products (e.g. phosphorus, acids, coke), which adversely affects the cost of the end products.

It is economically advantageous, therefore, to have a process, wherein all said products could be continuously manufactured according to a single flow chart on the basis of cheap raw material and avoiding the use of other commercial products.

OBJECTS AND SUMMARY OF THE INVENTION

It is an object of the present invention to provide a novel process for the production of hydrogen fluoride, phosphoric anhydride, calcium polyphosphates and nitric acid according to a single flow chart by complex processing of natural phosphates.

These and other objects are attained in a process which, in accordance with the invention, comprises heating dispersed natural phosphate in the presence of water vapors by a plasma stream of working gas to a temperature providing for the recovery of fluorine from said phosphate to form hydrogen fluoride, the bulk temperature of said stream diminishing in the process;

separating said cooled stream containing the hydrogen fluoride from the heated defluorinated phosphate and recovering the hydrogen fluoride from the stream;

heating and defluorinated dispersed phosphate in an air plasma stream having a bulk temperature of at least 3,500° K. and containing nitrogen oxides, said defluorinated phosphate decomposing to form phosphorus anhydride and calcium oxide, and the nitrogen oxides being quenched; and cooling the air plasma stream containing the nitrogen oxides, the phosphoric anhydride and the calcium oxide to a bulk temperature selected depending on the type of end product which it is desired to obtain.

In order to manufacture phosphoric anhydride and nitric acid, the air plasma stream containing the nitrogen oxides, the phosphoric anhydride and the calcium oxide is cooled to a bulk temperature not below that at which calcium oxide and phosphoric anhydride enter into a reaction; the calcium oxide is recovered; the stream stripped of the calcium oxide is further cooled to the temperature of condensation of phosphoric anhydride; the phosphoric anhydride is recovered; and the nitrogen oxides are absorbed from the stream by weak nitric acid or water to form nitric acid.

In order to manufacture calcium polyphosphates and nitric acid, the air plasma stream the containing nitrogen oxides, the phosphoric anhydride and the calcium oxide is cooled to a bulk temperature below that at which phosphoric anhydride reacts with calcium oxide, but not below the temperature of condensation of phosphoric anhydride; then the calcium polyphosphates which are formed in the reaction of phosphoric anhydride and calcium oxide are recovered, and the nitrogen oxides are absorbed from the stream by weak nitric acid or water to form nitric acid.

Should it be required to obtain simultaneously phosphoric anhydride, calcium polyphosphates and nitric acid, the air plasma stream containing the nitrogen oxides, the phosphoric anhydride and the calcium oxide is divided into two streams, one of which is cooled to a bulk temperature not below that at which calcium oxide reacts with phosphoric anhydride, the calcium oxide is recovered at the latter temperature, the stream now free from calcium oxide is further cooled to the temperature of condensation of phosphoric anhydride, the phosphoric anhydride is recovered, and the nitrogen oxides are absorbed from the stream by weak nitric acid or water to form nitric acid; the other stream is cooled to a bulk temperature below that at which phosphoric anhydride reacts with calcium oxide, but not below the temperature of condensation of phosphoric anhydride, the calcium polyphosphates produced in the reaction of phosphoric anhydride with calcium oxide are recovered, and the nitrogen oxides are absorbed from the stream by weak nitric acid or water to form nitric acid.

Thus, the process of this invention can be used to produce hydrogen fluoride, phosphoric anhydride, calcium polyphosphates and nitric acid as commercial end products.

The term "working gas" implies any gas or a mixture of gases which may be employed to be heated in a plasma heater, e.g. argon, nitrogen or air.

The term "working gas plasma stream" stands to mean a stream of working gas heated to a bulk temperature of not below 2,500° K.

The term "air plasma stream" implies an air stream heated to a bulk temperature of not below 3,500° K.

The term "dispersed natural phosphate" implies beneficiated or non-beneficiated ore which includes phosphoric anhydride in the form of phosphates as well as fluorine in the form of calcium fluoride, communited to a size of not greater than 1 mm.

The term "calcium polyphosphate" implies a compound of phosphoric anhydride and calcium oxide of the general formula $Ca_nP_nO_{3n+1}$ (for example, calcium tripolyphosphate $Ca_3P_3O_{10}$) and/or $Ca_nP_{2n}O_{6n}$ (for example, calcium metaphosphate $Ca(PO_3)_2$, as well as acid calcium phosphates of the general formula $Ca_{n-1}H_nP_nO_{3n+1}$ (for example, acid calcium pyrophosphate $CaH_2P_2O_7$), where $n = 1, 2, 3 ...$ The term "nitrogen oxide quenching" stands to mean cooling an air plasma stream containing nitrogen oxides at a rate of at least $10^6$ deg/sec.

The term "bulk temperature" implies a temperature averaged over the volume of the plasma stream of the working gas or the stream of the air plasma and determined by the mass flow rate of the gas and its total heat content.

As follows from the description of the methods whereby the object of the invention is attained, the proposed process offers the following advantages:

high rate of the process, ensured by the processing of large quantities of dispersed natural phosphate within a short time;

the process is continuous and involves but one step, as follows from the flow chart given hereinbelow;

the process does not require other commercial products, e.g. phosphorus, sulfuric acid phosphoric acid, or coke;

the feedstock requires no special preparation, e.g. admixing natural phosphate with various additives or agglomeration;

the process permits using natural phosphates in a wide range of particle sizes as determined by the design features of the requisite apparatus;

the process can be employed to process natural phosphates containing far lower levels of useful constituents than are amenable to the prior art techniques, since the latter involve the consumption of other commercial products listed hereabove;

the process allows comprehensive utilization of the useful components contained in natural phosphates; and since a single process yields several commercial products, the proposed technique is less capital intensive than the prior art processes.

Other objects and advantages of the present invention will become apparent from the following detailed description of a preferred embodiment thereof taken in conjunction with the accompanying drawing which illustrates the flow chart of the proposed process.

DETAILED DESCRIPTION OF THE INVENTION

A continuous stream of working gas is heated in a plasma heater 1 to a bulk temperature of at least 2,500° K., and the resultant gas plasma stream is sent to a plasmochemical reactor 2 whereinto dispersed natural phosphate and water or water vapors are simultaneously continuously supplied by a feeder 3 and a metering device 4, respectively. In the reactor 2, the gas plasma stream is mixed with the water vapors and the dispersed natural phosphate, heating the latter to a temperature at which fluorine is liberated from the natural phosphate, the bulk temperature of the gas plasma stream dropping to a temperature of not below 1,500° K.

The water vapors present in the reactor boost the process of fluorine liberation from the particles of said phosphate. It should be noted that the plasma stream of working gas flowing around the particles of said phosphate assists in the removal of the liberated fluorine from the surface of said phosphate particles, thereby boosting the process of fluorine liberation from said phosphate. The liberated fluorine reacts with the water vapors, forming hydrogen fluoride.

In the bottom portion of the plasmochemical reactor 2, the plasma stream of working gas cooled to 1,500° K. and containing the water vapors, the hydrogen fluoride and the particles of defluorinated phosphate trapped by the stream, is separated from the bulk of heated particles of the defluorinated phosphate and delivered to a cyclone 5, wherein fine particles of defluorinated phosphate are separated from said gas stream, and the gas stream is thereafter sent to a condenser (not shown in the drawing) for the recovery of the hydrogen fluoride as a commercial product.

From the bottom portion of the plasmochemical reactor 2 and cyclone 5, the heated particles of defluorinated phosphate are continuously fed into a plasmochemical reactor 6. Simultaneously, a stream of air plasma obtained in a plasma heater 7 is continuously supplied into the plasmochemical reactor 6. In the air plasma stream heated to a bulk temperature of not below 3,500° K. there arise nitrogen oxides. Said heated particles of defluorinated phosphate react with the air plasma stream with the result that the particles of defluorinated phosphate decompose to form phosphoric anhydride and calcium oxide.

In its turn, at said temperature (i.e. above 2,000° K.) the phosphoric anhydride decomposes to lower phosphorus oxides and oxygen, thereby increasing the oxygen level in the air plasma stream. At said temperatures, the oxygen of the air plasma stream reacts with the nitrogen to form an additional quantity of nitrogen oxides, raising the total amount of nitrogen oxides in the air plasma stream.

In the reactor 6, the particles of defluorinated phosphate decompose, taking away heat from the air plasma stream, which contributes to the quenching of the nitrogen oxides contained in the air plasma stream, thereby preventing the nitrogen oxides from decomposing, which likewise raises the concentration of the nitrogen oxides.

The mass flow rate ratio of the defluorinated phosphate to the air heated in the heater 7 may vary within broad limits depending on the design features and geometrical size of the plasmochemical reactor 6 as well as on the economics of the process as a whole, but in any case this ratio must provide for total decomposition of the defluorinated phosphate to phosphoric anhydride and calcium oxide.

In the bottom portion of the plasmochemical reactor 6, the liquid and solid particles of slag which are formed in the decomposition of said defluorinated phosphate together with individual liquid and solid particles of said incompletely decomposed natural phosphate are separated from the air plasma stream carrying the nitrogen oxides, the lower phosphorus oxides and the solid particles of calcium oxide, delivered into a hopper 8, and removed therefrom.

The air plasma stream of a bulk temperature around 3,000° K. stripped of said liquid and solid particles and containing the nitrogen oxides, the lower phosphorus oxides and the calcium oxide is discharged from the reactor 6 and divided into two sub streams. One of the latter substreams is sent to a quenching device 9 wherein the temperature of said substream is rapidly decreased to a value not below 2,000° K. The solid particles of calcium oxide are recovered from the cooled stream in a cyclone 10. Then the stream is cooled in a heat exchanger 11 to a temperature at which phosphoric anhydride starts condensing from the lower phosphorus oxides under the action of the oxygen present in the stream; then the stream is sent to a cyclone 12 wherein the solid particles of phosphoric anhydride are separated from the gas stream as a commercial product. Said stream is completely stripped of solid phosphoric anhydride on a filter 13. From the filter 13, the gas stream containing the nitrogen oxides and now having a temperature of about 450° K. is directed to an absorber 14 wherein the nitrogen oxides are absorbed from the stream by weak nitric acid or water to form nitric acid as a commericial product.

The other substream is directed to a quenching reactor 15 wherein the said stream is first abruptly cooled to a temperature not below that at which phosphoric anhydride starts condensing, and then the stream is subjected to slow cooling, giving rise to a reaction between the gaseous phosphoric anhydride, which was formed from the lower phosphorus oxides and oxygen on cooling, and the solid particles of calcium oxide to form polyphosphates.

The emergence of calcium polyphosphates (calcium pyrophosphate, tripolyphosphate, tetrapolyphosphate, tetrametaphosphate, trimetaphosphate and admixtures of higher-molecular phosphates) was verified by paper chromatography and IR spectroscopy.

Should it be required to produce acid calcium phosphates, water vapors are introduced into the quenching reactor 15, resulting in the formation of acid calcium phosphates, e.g. acid calcium pyrophosphate, again as confirmed by paper chromatography and IR spectroscopy.

The $P_2O_5/CaO$ ratio in the resultant calcium polyphosphates varies from 1.20 to 2.35.

From the quenching reactor 15, the gas stream carrying the solid particles of calcium polyphosphates and the nitrogen oxides is directed to a cyclone 16 wherein said polyphosphate particles are recovered from the gas stream as a commercial product.

The gas stream stripped of the polyphosphates and containing the nitrogen oxides is cooled in a heat exchanger 17 to a temperature at which nitrogen dioxide starts forming and directed to the absorber 14 wherein the nitrogen oxides are absorbed by water or weak nitric acid as the spray fluid to form nitric acid as a commercial product.

Depending on the type of products to be manufactured, the entire air plasma stream emerging from the reactor 6 may be directed along the path of either one of said substreams.

Practice of the novel process of this invention may be further understood by reference to the following examples taken in conjunction with the accompanying drawing.

EXAMPLE 1

Working gas — nitrogen — at the rate of 8.0 g/sec is heated in the plasma heater 1 and supplied to the reactor 2 whereinto is simultaneously delivered by the feeder 3 10.0 g/sec of dispersed natural phosphate of particle size about 250 mcm. Simultaneously, water vapor is fed into the reactor 2 at the rate of 1.0 g/sec by the metering device 4. The approximate composition of the natural phosphate is as follows: $P_2O_5$, 28%; CaO, 42%; $SiO_2$, 13%; F, 2.5%; other admixtures, 14.5%. In the reactor 2, said phosphate is subjected to hydrothermal treatment to form hydrogen fluoride which is mixed with the stream carrying defluorinated phosphate particles, and said stream having a bulk temperature of some 1,700° K. is delivered to the cyclone 5 to be stripped of said particles. Having been stripped, the stream is subjected to hydrogen fluoride recovery. The approximate composition of the gas stream is as follows: HF, to about 40.0 g/cu.nm; $CO_2$, about 100.0 9/cu.nm; and $SiF_4$, about 7.0 g/cu.nm. The extent of fluorine recovery is 97 or 98 percent.

From the reactor 2, the defluorinated natural phosphate particles are delivered to the reactor 6 whereinto is also fed a stream of air plasma containing nitrogn oxides obtained in the plasma heater 7, the rate of air flow into the heater 7 being about 10.0 g/sec.

As the air plasma stream gets mixed with the deflourinated natural phosphate particles, the latter decompose to phosphoric anhydride and calcium oxide. Said stream having a temperature of about 3,000° K. is discharged from the reactor 6. The slag and the non-reacted particles of said phosphate are collected in the hopper 8 wherefrom they are continuously discharged.

The gas stream discharged from the reactor 6 and carrying some 300 g/cu.nm of phosphorus oxide (converted to $P_2O_5$), about 5.0 volume percent of nitrogen (converted to NO) and about 500 g/cu.nm of calcium oxide, is divided into two equal substreams.

One substream in directed into the quenching device 9 to be abruptly cooled to 2,000° K. therein, and then into the cyclone 10 where the solid particles of calcium oxide are separated from said substream. From the cyclone 10, the substream is supplied to the heat exchanger 11 to be further cooled to 600° K., the phosphoric anhydride condensing as solid particles which are separated from the gas stream in the cyclone 12 and on the filter 13. The yield of phosphoric anhydride is approximately 150 g/cu.nm.

The extent of recovery of phosphoric anhydride from natural phosphate is from 90 to 85 percent, the phosphoric anhydride particle size being up to 5 mcm.

The nitrogen oxides contained in the stream are absorbed by water in the absorber 14 to form nitric acid of concentration 45%.

The second gas substream is directed into the quenching reactor 15 wherein a temperature of approximately 700° K. is maintained. In the reactor 15, the gaseous phosphoric anhydride reacts with the solid particles of calcium oxide to form calcium polyphosphates at a $P_2O_5$/CaO ratio of 2.34. The polyphosphate particle size is up to 10 mcm. The approximate chemical composition of the polyphosphates is as follows: $P_2O_5$, about 70% CaO, about 30%. The yield of polyphosphates is about 200 g/cu.nm. After the polyphosphates have been recovered from the stream in the cyclone 16 and said stream has been cooled in the heat exchanger 17 to 450° K., the nitrogen oxides are recovered by water in the absorber 14 to yield, at the output of the absorber 14, nitric acid of concentration about 45%.

EXAMPLE 2

In this example, the procedure of Example 1 is duplicated except that the stream emerging from the reactor 6 is not divided into two substreams, but is wholly directed along the route of phosphoric anhydride and nitric acid production.

From the reactor 6, said stream containing about 300 g/cu.nm of phosphorus oxides (converted to $P_2O_5$), about 5.0 volume percent of nitrogen oxides (converted to NO) and about 500 g/cu.nm of solid particles of calcium oxide, and having a bulk temperature of around 3,000° K., is first delivered into the quenching device 9, then into the cyclone 10 to be stripped of said solid particles of calcium oxide, and then into the heat exchanger 11 wherein the gas stream is cooled to 600° K., at which temperature phosphoric anhydride condensation occurs.

The condensed particles of phosphoric anhydride are separated from the gas stream containing the nitrogen oxides in the cyclone 12 and on the filter 13. The extent of recovery of phosphoric anhydride from natural phosphate is approximately 95 percent. The particle size of phosphoric anhydride is up to 5 mcm. The yield of phosphoric anhydride is about 290 g/cu.nm.

The nitrogen oxides are absorbed in the absorber 14 to form nitric acid of concentration about 45%.

EXAMPLE 3

In this example, the procedure of Example 1 is duplicated except that the entire stream emerging from the reactor 6 is directed along the route of calcium polyphosphates and nitric acid production.

From the reactor 6, said stream is directed into the quenching reactor 15 wherein the temperature of the stream is reduced to 1,600° K., and the gaseous phosphoric anhydride reacts with the solid particles of calcium oxide to form calcium polyphosphates having a $P_2O_5$/CaO ratio of 2.34.

The yield of polyphosphates is about 500 9/cu:nm.

The approximate composition of the polyphosphates is as follows: $P_2O_5$, about 70%; CaO, about 30%.

The calcium polyphosphate particle size is 5 to 10 mcm.

Upon recovery of the polyphosphates from the stream in the cyclone 16 and cooling of the stream in the heat exchanger 17 to 450° K., the nitrogen oxides are absorbed from the stream by water in the absorber 14 to form nitric acid of concentration about 45%.

What is claimed is:

1. A process for the simultaneous production of hydrogen fluoride, phosphoric anhyride, calcium polyphosphates and nitric acid, comprising the steps of:
    a. heating dispersed natural phosphate in the presence of water vapors by a plasma stream of working gas of a bulk temperature of at least 2500° K to a temperature ensuring the recovery of fluorine from said phosphate to form hydrogen fluoride, the bulk temperature of said stream decreasing;

b. separating said cooled stream containing the hydrogen fluoride from the heated defluorinated phosphate and recovering the hydrogen fluoride from the stream;

c. heating the defluorinated dispersed phosphate by a stream of air plasma having a bulk temperature of at least 3500° K and containing nitrogen oxides, said phosphates decomposing to form phosphoric anhydride and calcium oxide, and the nitrogen oxides being quenched;

d. dividing the stream of air plasma, containing nitrogen oxides, phosphoric anhydride and calcium oxide into two separate streams;

e. cooling one of said streams to a bulk temperature that is not lower than the point at which reaction starts between calcium oxide and phosphoric anhydride; recovering calcium oxide; further cooling the stream to the condensation point of phosphoric anhydride and recovering the latter, and absorbing the nitrogen oxides from the stream by a weak nitric acid or water so that nitric acid is formed;

f. cooling the other stream to a bulk temperature that is below the point at which reaction between phosphoric anhydride and calcium oxide starts, but not below the condensation temperature of phosphoric anhydride; recovering the resulting calcium polyphosphates in the form of solid particles, and absorbing nitrogen oxides from the stream by weak nitric acid or water so that nitric acid is formed.

2. A process for the simultaneous production of hydrogen fluoride, phosphoric anhydride and nitric acid, comprising the steps of:

a. heating dispersed natural phosphate in the presence of water vapors by a plasma stream of working gas of a bulk temperature of at least 2500° K to a temperature ensuring the recovery of fluorine from said phosphate to form hydrogen fluoride, the bulk temperature of said stream decreasing;

b. separating said cooled stream containing the hydrogen fluoride from the heated defluorinated phosphate and recovering the hydrogen fluoride from the stream;

c. heating the defluorinated dispersed phosphate by a stream of air plasma having a bulk temperature of at least 3500° K and containing nitrogen oxides, said phosphate decomposing to form phosphoric anhydride and calcium oxide, and the nitrogen oxides being quenched;

d. cooling the stream of air plasma containing nitrogen oxides, phosphoric anhydride and calcium oxide to a bulk temperature that is not lower than the point at which reaction starts between calcium oxide and phosphoric anhydride; recovering calcium oxide; further cooling the stream to the condensation point of phosphoric anhydride and recovering the latter, and absorbing the nitrogen oxides from the stream by a weak nitric acid or water so that nitric acid is formed.

3. A process for the simultaneous production of hydrogen fluoride, calcium polyphosphates and nitric acid, comprising the steps of:

a. heating dispersed natural phosphate in the presence of water vapors by a plasma stream of working gas of a bulk temperature of at least 2500° K to a temperature ensuring the recovery of fluorine from said phosphate to form hydrogen fluoride, the bulk temperature of said stream decreasing;

b. separating said cooled stream containing the hydrogen fluoride from the heated defluorinated phosphate and recovering the hydrogen fluoride from the stream;

c. heating the defluorinated dispersed phosphate by a stream of air plasma having a bulk temperature of at least 3500° K and containing nitrogen oxides, said phosphate decomposing to form phosphoric anhydride and calcium oxide, and the nitrogen oxides being quenched;

d. cooling the stream of air plasma containing nitrogen oxides, phosphoric anhydride, and calcium oxide to a bulk temperature that is below the point at which reaction between phosphoric anhydride and calcium oxide starts, but not below the condensation temperature of phosphoric anhydride; recovering the resulting calcium polyphosphates in the form of solid particles, and absorbing nitrogen oxides from the stream by weak nitric acid or water so that nitric acid is formed.

* * * * *